(12) United States Patent
Klein (10) Patent No.: US 6,216,224 B1
(45) Date of Patent: *Apr. 10, 2001

(54) METHOD FOR READ ONLY MEMORY SHADOWING (75) Inventor: Dean A. Klein, Eagle, ID (US)

(73) Assignee: Micron Technology Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/092,460

(22) Filed: Jun. 5, 1998

(51) Int. Cl.⁷ .................................................. G06F 9/445
(52) U.S. Cl. ............................... 713/1; 709/222; 710/104
(58) Field of Search .................................. 713/1, 2, 100, 713/200; 712/1, 228; 710/1, 48, 101, 8–10, 104; 714/42, 6; 395/494; 326/40; 709/220, 221, 222

(56) References Cited

U.S. PATENT DOCUMENTS

| | | | |
|---|---|---|---|
| 4,811,219 | * | 3/1989 | Touji et al. ............................ 364/405 |
| 4,896,289 | * | 1/1990 | Svinicki et al. ........................ 714/34 |
| 5,566,325 | * | 10/1996 | Bruce, II et al. ...................... 395/494 |
| 5,583,987 | * | 12/1996 | Kobayashi et al. ..................... 714/13 |
| 5,592,616 | * | 1/1997 | Finch et al. ............................ 714/42 |
| 5,608,876 | * | 3/1997 | Cohen et al. .......................... 710/101 |
| 5,740,399 | * | 4/1998 | Mayfield et al. ...................... 711/137 |
| 5,742,758 | * | 4/1998 | Dunham et al. ....................... 713/200 |
| 5,835,695 | * | 11/1998 | Noll ....................................... 714/6 |
| 5,835,784 | * | 11/1998 | Gillespie et al. ....................... 710/10 |
| 5,842,012 | * | 11/1998 | Walker et al. .......................... 713/2 |
| 5,850,152 | * | 12/1998 | Cliff et al. ............................. 326/40 |
| 5,854,937 | * | 12/1998 | Woodward ............................ 712/1 |
| 5,892,943 | * | 4/1999 | Rockford et al. ...................... 713/2 |
| 5,987,537 | * | 11/1999 | Brainard et al. ....................... 710/48 |
| 5,999,989 | * | 12/1999 | Patel ..................................... 710/1 |

* cited by examiner

Primary Examiner—Thomas Lee
Assistant Examiner—Rijue Mai
(74) Attorney, Agent, or Firm—Dorsey & Whitney LLP (57) ABSTRACT

A method that employs a ROM shadowing circuit to transfer ROM data to the RAM in order to implement the ROM shadowing process required during the initialization of a PC. When the ROM shadowing circuit detects a system reset signal, the ROM shadowing circuit holds the CPU in a reset state while the ROM shadowing circuit copies the ROM data to the RAM. When the data copy is completed, the ROM shadowing circuit releases the CPU, which then begins fetching and executing instructions that comprise firmware initialization routines from the RAM.

45 Claims, 5 Drawing Sheets

METHOD FOR READ ONLY MEMORY SHADOWING

TECHNICAL FIELD

The present invention relates to the initialization of a personal computer following a reset or powering on of the personal computer and, in particular, a method for transferring data from read only memory to random access memory without intervention of the central processing unit of the personal computer.

BACKGROUND OF THE INVENTION

When a personal computer ("PC") is powered on or reset, computer instructions comprising a number of firmware routines are transferred from a read only memory ("ROM") which may or may not be a programmable read only memory ("PROM"), to system random access memory ("RAM"). Following transfer of the firmware routines from the ROM to the RAM, the central processing unit ("CPU") of the PC is initialized and firmware initialization routines, or bootstrap routines, are then run to initialize the remaining hardware and software components of the PC. This entire process, including the transfer of the firmware routines from the ROM to the RAM, is known as "booting a PC" or as "the bootstrap process." The firmware initialization routines executed during the bootstrap process are called the "bootstrap routines."

The firmware routines transferred to the RAM when a PC is booted include the routines of the basic input/output system ("BIOS"), an interrupt service routine, a power-on self test routine, and the various initialization routines that are executed only during the bootstrap process. These firmware routines are transferred from the ROM to the RAM under control of the CPU in a process known as read only memory ("ROM") shadowing. The CPU repeatedly fetches and executes the instructions for transferring the firmware routines from the ROM, as well as the instructions of the firmware routines themselves, in a multi-step process involving transfer of instructions over a relatively low-speed bus and storage of the instructions in a temporary register. Once ROM shadowing has been completed, the CPU then begins to execute the firmware routines from the system RAM.

One reason for ROM shadowing is that it is far more efficient to first perform ROM shadowing before executing the firmware routines. Fetching and executing instructions from the RAM over a relatively high-speed memory bus is so much faster than fetching and executing those same instructions over one or more relatively low-speed peripheral buses that the overhead of first transferring the firmware routines from ROM to RAM is more than offset by the faster execution of the firmware routines from RAM than from ROM.

A second reason for ROM shadowing is that, once the firmware CPU initialization routines have been executed, the firmware initialization routines can be discarded. The remaining BIOS software routines can then be more efficiently stored in the RAM and that portion of the RAM formerly occupied by the initialization routines can be used to store other data or computer instructions.

Figure 1:
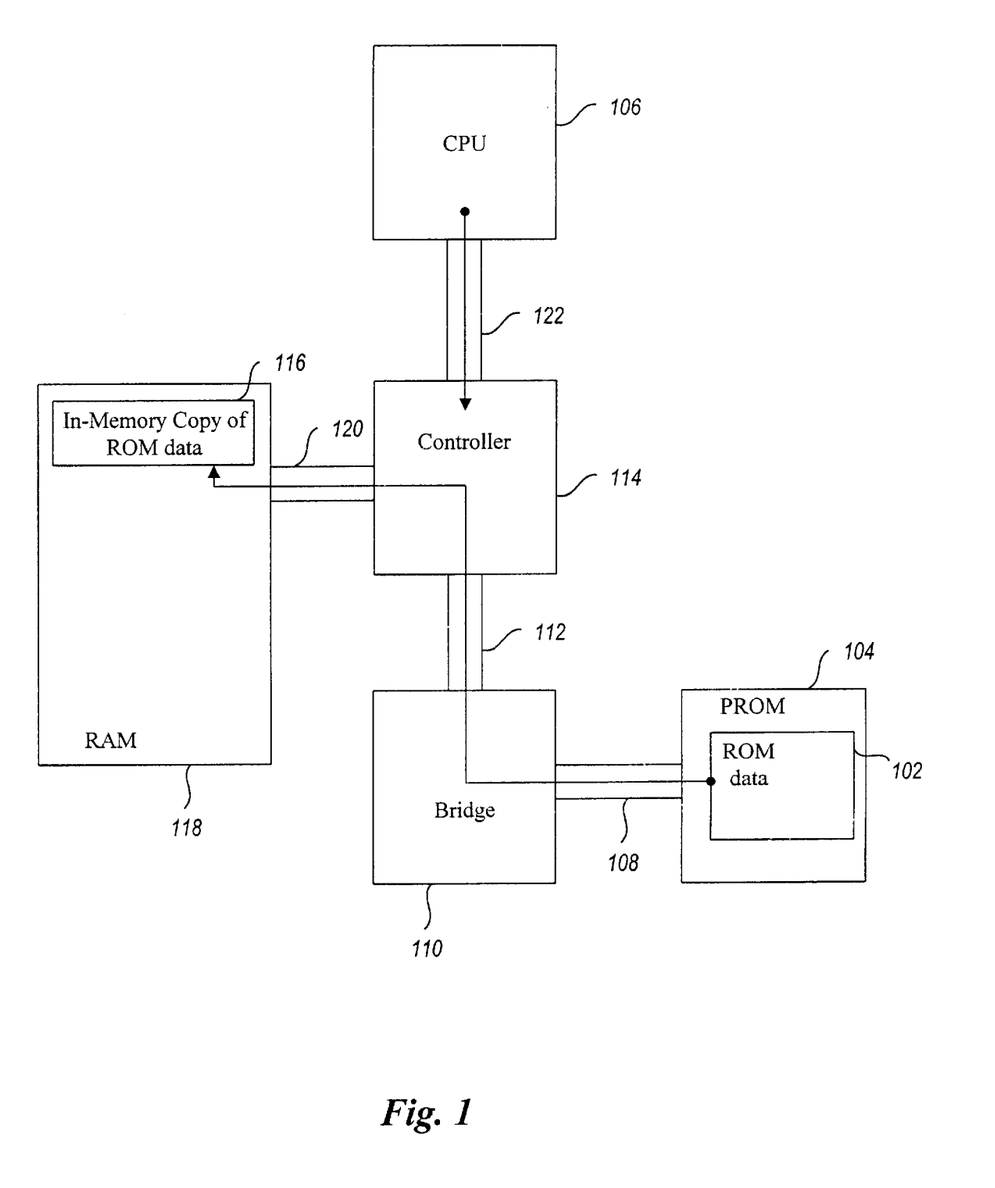
FIG. 1 is a block diagram of the basic PC components involved in conventional ROM shadowing.

FIG. 1 is a block diagram of the basic components of currently-available PCs that are involved in ROM shadowing. The firmware routines are stored as ROM data 102 in a ROM 104. During conventional ROM shadowing, the firmware routines are transferred, under control of the CPU 106, via an ISA bus 108, an ISA-20 PCI bus bridge 110, and a PCI bus 112 to a system controller 114. The system controller 114 then stores the data 116 in the RAM 118 via a memory bus 120. The CPU 106 repeatedly fetches and executes a small number of instructions from the ROM 104 via the ISA bus 108, the ISA-PCI bus bridge 110, the PCI bus 112, the system controller 114, and a CPU bus 122 in order to drive the system controller 114 to transfer the ROM data 102 to the RAM 118. When transfer of the firmware routines is complete, the CPU 106 is then initialized and, following initialization, the CPU fetches and executes the firmware initialization and BIOS routines directly from the system RAM 118 via the memory bus 120, system controller 114, and CPU bus 122. These routines direct the CPU 106 to read the operating system of the PC, or portions thereof, into the RAM 118 from a storage device (not shown), initialize various hardware and software system components (not shown), and thereby bring the PC up to a state where it can be used by a human operator.

Although ROM shadowing vastly increases the speed of PC initialization by speeding up subsequent execution of firmware routines, transfer of the firmware routines to the system RAM 116 in Intel Pentium CPU-based PCs is inefficient. The inefficiencies in ROM shadowing arise largely because the Intel Pentium CPU is not yet initialized when it carries out ROM shadowing. As one result, the instruction cache (not shown) is not available within the CPU 106, requiring the CPU 106 to repeatedly fetch and execute the instructions of a small loop of instructions that transfer the firmware routines from the ROM 104 to the RAM 118. Each instruction is loaded from the ROM 104, via at least one relatively low-speed bus, into a register and then executed in a second step. When a CPU 106 has been initialized, and instruction caching is available, the instructions of a small loop of instructions are fetched only once from the RAM during the first iteration of the loop. The instructions are stored in the CPU instruction cache as they are fetched. When the instructions are needed in a subsequent iteration of the loop, they are fetched from the instruction cache, rather than from the RAM. Instructions in the CPU instruction cache can be fetched more quickly than instructions in memory because, by fetching from the instruction cache, access of instruction through the system controller 114 and either the memory bus 120, in the case of instructions fetched from the RAM 118, or the ISA 108 and PC 112 buses, in the case of instructions fetched from the ROM 104, is avoided. However, in an uninitialized Pentium CPU, caching is not available, and therefore each instruction of the loop of instructions that transfer the firmware routines from the ROM 104 to the RAM 118 must be fetched from the ROM 104 prior to execution during each iteration of the loop.

Intel Pentium processors prefetch instructions. Instruction prefetch allows a CPU to simultaneously execute one instruction while fetching the next instruction from memory. Instruction prefetch is very efficient for executing a linear, sequential series of instructions. It is also efficient when the CPU can correctly predict which of two possible instructions following a branch instruction will be next executed. However, if the instruction being executed causes the processor to branch to an instruction other than the predicted instruction, the instruction being incorrectly prefetched from memory will then need to be discarded from an internal cache within the CPU. CPU execution is stalled until the instruction that is the target of the branch instruction is read from memory by the CPU.

An uninitialized CPU cannot perform effective branch prediction. A second result of carrying out ROM shadowing with an uninitialized CPU is that prefetching will, in a large percentage of cases, obtain the wrong instruction. The loop of instructions used to transfer the firmware routines from the ROM 104 to the RAM 118 is a very tight loop in which a unit of data is transferred from the ROM to the RAM, a counter is decremented, and a branch instruction is executed to return control back to the top of the loop. Thus, a large proportion of the instructions executed during ROM shadowing are branch instructions. Because effective branch prediction cannot be carried out by an uninitialized CPU, the tight loop of instructions used in ROM shadowing effectively defeats the prefetch strategy of the CPU and further slows the ROM shadowing process. A need has therefore been recognized for a way to transfer firmware routines from the ROM to the RAM during PC initialization that does not require execution of a loop of instructions by the CPU.

SUMMARY OF THE INVENTION

One embodiment of the present invention in a computer employs hardware circuitry, such as an application-specific integrated circuit ("ASIC"), to transfer ROM data to the system RAM in order to implement ROM shadowing, prior to the initialization of the CPU, as part of the bootstrap process. When this ROM shadowing circuitry detects a system reset signal, the ROM shadowing circuit holds the CPU in a reset state while the ROM shadowing circuit drives the system controller to transfer the ROM data to the RAM. When the ROM data transfer is completed, the ROM shadowing circuit releases the CPU, which then begins fetching and executing instructions from firmware routines included in the ROM data that was transferred to the RAM. The ROM shadowing circuit includes a state machine that incorporates an address counter and a logic circuit that holds the CPU in a reset state while the ROM data is being transferred.

DETAILED DESCRIPTION OF THE INVENTION

The present invention provides a method that employs a ROM shadowing circuit ("RSC") to copy firmware routines from the ROM to the RAM during computer system initialization. The present invention is described below as implemented for a PC. The present invention may be applied to ROM shadowing on many different types of computer systems. The details of implementation may be markedly different in the different types of computer systems. The RSC includes a state machine and an address counter. The state machine repeatedly generates a set of signals that direct the system controller to read a firmware routine instruction from the ROM address corresponding to the current contents of the address counter and to write the firmware routine instruction read from the ROM to the RAM address corresponding to the current contents of the address counter, after which the state machine decrements the address counter by one. The state machine replaces the execution, by the uninitialized CPU in a PC, of a loop of instructions that transfer the firmware routines from the ROM to the RAM during conventional ROM shadowing.

While the state machine transfers the firmware routines from the ROM to the RAM, the CPU is held in a reset state by the RSC. When the transfer of the firmware routines has been completed, the RSC releases the CPU. The CPU is then initialized and begins to fetch and execute instructions of certain of the firmware routines copied from the ROM to the RAM. These firmware routines direct the CPU to read the operating system of the PC, or portions thereof, into memory from a storage device, initialize various system components, and thereby bring the PC up to a state where it can be used by a human operator.

Figure 2:
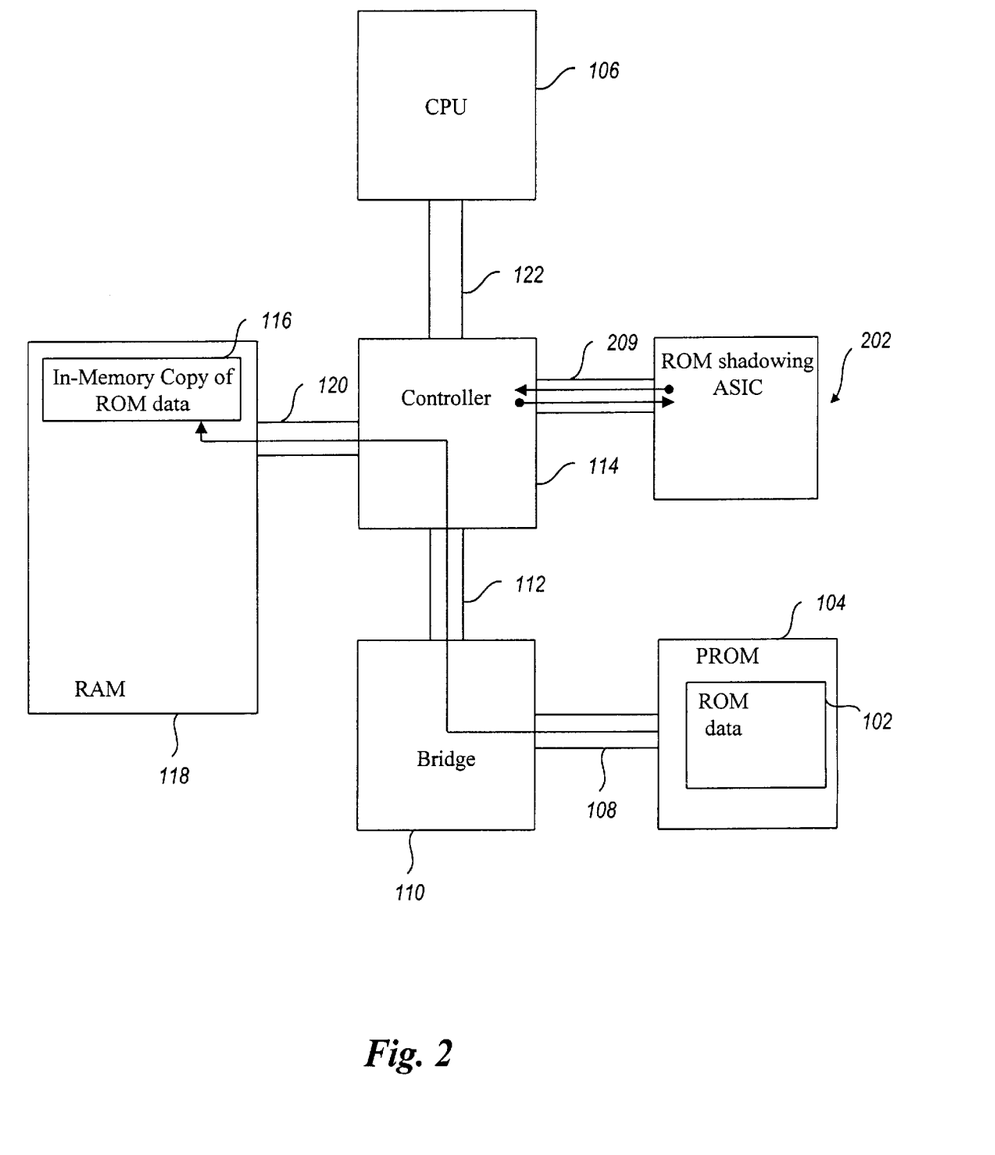
FIG. 2 is a block diagram of the PC components involved in ROM shadowing in accordance with one embodiment of the invention.

FIG. 2 is a block diagram of the PC components involved in ROM shadowing in accordance with one embodiment of the invention. The majority of the components shown in FIG. 2 are identical to the components shown in FIG. 1. Thus, in the interest of brevity, those components of FIG. 2 that are identical to components in FIG. 1 have been provided with the same reference numerals as in FIG. 1, and an explanation of their operation will not be repeated.

In the PC shown in FIG. 2, ROM data 102, including firmware routines, is transferred from the ROM 104 via the ISA bus 108, the ISA-PCI bus bridge 110, the PCI bus 112, the system controller 114, and the memory bus 120 to the RAM 118, as in the currently-available PC of FIG. 1. However, the system controller 114 in the PC of FIG. 2 is driven by an RSC 202, in this case a ROM shadowing ASIC ("RSA"), rather than by the CPU 106, as in the PC of FIG. 1. The RSC replaces execution by the CPU 106 in conventional PCs of a small instruction loop for transferring the firmware routines from the ROM 104 to RAM 118. No instructions need to be fetched from the ROM 104 or from the RAM 118 and executed by the CPU 106 during ROM shadowing in the PC of FIG. 2. Thus, the inefficiencies incurred by repeatedly fetching and executing instructions from the ROM, compounded by the absence of CPU branch prediction and the resulting defeat of the prefetch strategy used by the CPU 106, are completely avoided when the RSC 202, and not the CPU 106, provides control signals via bus 204 to the system controller 114 for carrying out the ROM data copy.

Figure 3:
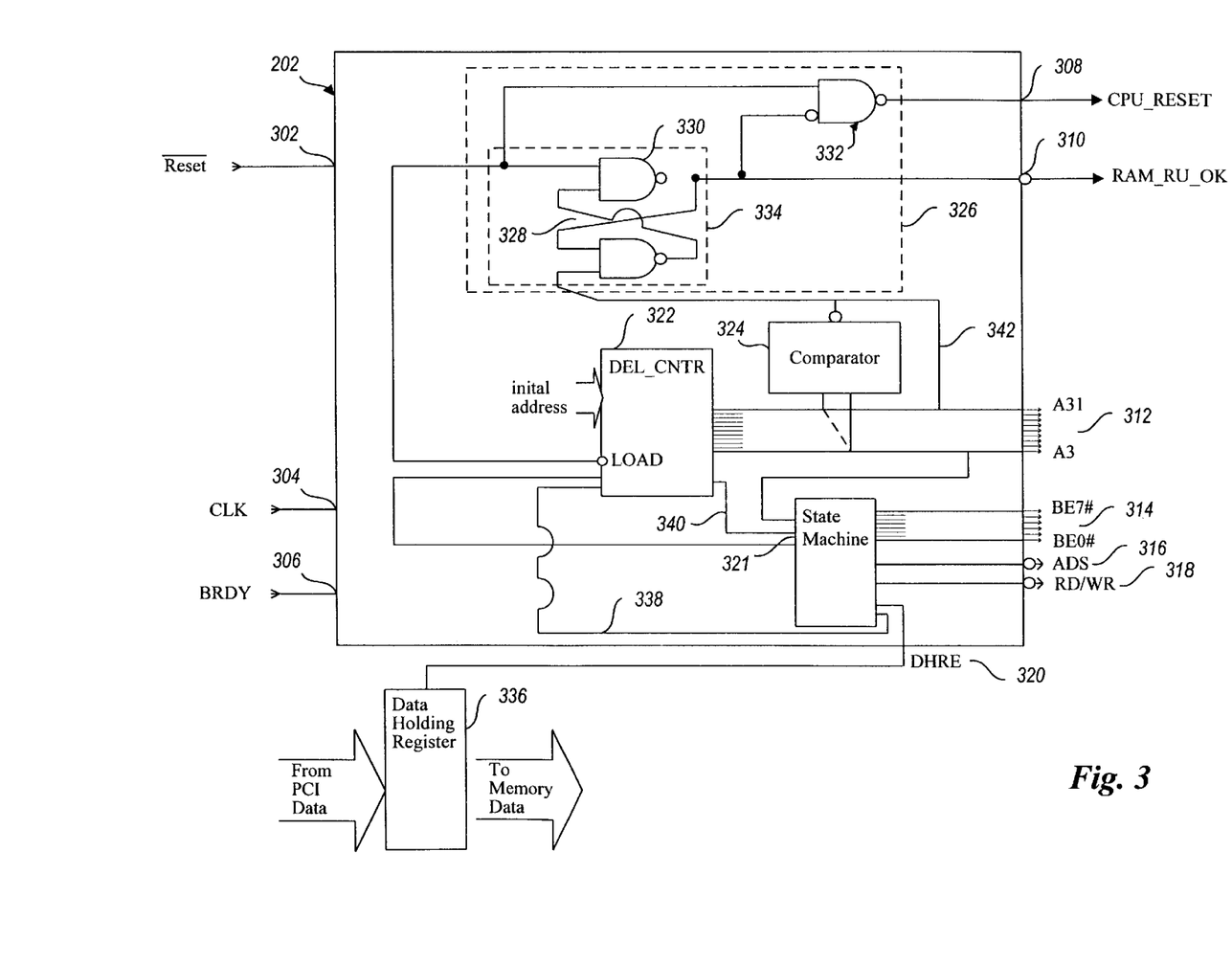
FIG. 3 is a block diagram of one embodiment of ROM shadowing circuitry.

FIG. 3 is a block diagram of one embodiment of an RSC 202. Input signals to the RSC 202 include reset ("$\overline{\text{RESET}}$") 302, the system clock ("CLK") 304, and burst ready ("BRDY") 306. Outputs from the RSC 202 include CPU reset ("CPU_RESET") 308, RAM read okay ("RAM_RD_OK") 310, address signals A3 through A31 312, byte enable signals BE0# through BE7# 314, address status ("$\overline{\text{ADS}}$") 316, read/write ("RD/$\overline{\text{WR}}$") 318, and data holding register enable ("DHRE") 320. The inputs to, and outputs from, the RSC generally correspond to similarly named inputs and outputs for the Intel Pentium CPU family, as described in *Pentium Processor System Architecture*, Second Edition, Addison Wesley Publishing Company, by Don Anderson and Tom Shanley, 1995, hereby incorporated by reference. When asserted low in a conventional PC, $\overline{\text{RESET}}$ 302 causes the CPU 106 to undergo a hardware reset, following which ROM shadowing, CPU initialization, and the boot process are performed. In a PC incorporating the embodiment of the RSC 202 shown in FIG. 3, $\overline{\text{RESET}}$ 302 is input to the RSC 202, rather than the directly to the CPU 106. When asserted low in such a PC, $\overline{\text{RESET}}$ 302 starts the ROM shadowing operation of the RSC 202 while the RSC asserts the CPU_RESET output signal 308 in order to maintain the CPU 106 in a reset state until ROM shadowing is completed. After ROM shadowing is completed, the RSC 202 deasserts the CPU_RESET output signal, allowing the CPU to be initialized and to begin executing firmware routines from the RAM 118. Thus, operation of the RSC 202 can be described at a high level as the interception of a $\overline{\text{RESET}}$ input signal 302 asserted low and assertion of the CPU_RESET output signal 308, followed by hardware-implemented ROM shadowing and, finally, deassertion of the CPU_RESET output signal after ROM shadowing has been completed.

The RSC includes a state machine 321, a decrementing address counter 322, an address comparator 324, and a logic circuit 326 that includes three NAND gates 328–332. In operation, when the $\overline{\text{RESET}}$ input signal 302 is asserted low, the output of the NAND gate 332 goes high, thereby asserting the CPU_RESET output signal 308. NAND gates 328 and 330 together comprise a flip-flop 334. The low $\overline{\text{RESET}}$ input signal 302 also sets this flip-flop 334. The flip-flop thereby applies a high signal to the inverting input of NAND gate 332 until the flip-flop 334 is reset, even when the $\overline{\text{RESET}}$ input signal 302 transitions back to inactive high. The flip-flop thus guarantees that the CPU_RESET output signal 308 will be asserted high, and the CPU 106 kept in a reset state, until ROM shadowing is completed.

Besides setting the flip-flop 334 and causing the CPU_RESET output signal 308 to be asserted high, transition of the $\overline{\text{RESET}}$ input signal 302 low also preloads the decrementing address counter 322 with an initial address. When used to address ROM 104, the initial address is the highest address of the ROM data 102 that is transferred from ROM to RAM 118 during ROM shadowing. In the PC embodiment shown in FIG. 3, the initial address is also the highest RAM address at which the transferred data will be stored. In this embodiment, a 32-bit address is used to locate each quadword in RAM 118, while a 20-bit address is used to locate each byte in the ROM 104. The upper 12 bits of a 32-bit address are ignored when used to access the ROM 104. Thus, the same address can be used for both ROM and RAM addressing. In other embodiments, two different addresses, one for ROM, and one for RAM, may need to be maintained by the RSC. In some embodiments, the initial address may be the lowest address of the data to be transferred, and the address counter will be incremented, rather than decremented, as the ROM data is transferred. The initial address may be provided to the decrementing address counter 322 by suitable means, such as a ROM, hardwiring jumpers, etc.

The state machine 321 drives the RSC 202 to perform a number of operations that result in transfer of the ROM data 102 to the RAM 118. The state machine begins to perform these operations following assertion of a signal transmitted from the decrementing address counter 322 to the state machine via internal signal line 340. The decrementing address counter 322 asserts this signal when the decrementing address counter completes preloading the initial address in response to assertion low of the $\overline{\text{RESET}}$ input signal 302. As will be discussed in greater detail below, during each of these operations, a number of bytes of ROM data 102 are read from the ROM 104 and accumulated in the data holding register 336. Then, the accumulated bytes of data are written from the data holding register 336 to the RAM 118. The operations are timed by the clock input 304. Each operation is performed during a fixed number of clock cycles. The number of clock cycles per operation depends on a number of factors, including the size of the data units read from ROM, the size of the data units written to RAM, the characteristics of the intervening buses over which the data is transferred, and the CPU architecture. In the PC-based embodiment shown in FIG. 3, each operation, or cycle, of the RSC 202, as controlled by the state machine 321, occurs during a fixed number of bus cycles that are each performed during a fixed number of clock cycles. During a first set of one or more bus cycles ("read cycles"), a fixed number of bytes is read from the ROM 104 and accumulated in the data holding register 336. During a second set of one or more bus cycles ("write cycles"), the bytes accumulated in the data holding register 336 are written to RAM 118. The address currently stored in the decrementing address counter 322 is used both to read from the ROM 104 and to write to the RAM 118 in the read and write cycles, respectively, and is then decremented by one prior to the start of the first bus cycle of the next RSC operation. The state machine 321 directs the decrementing address counter 322 to decrement the address currently contained within the decrementing address counter by one via assertion of an output signal that is input to the decrementing address counter 322 via internal signal line 338. The DHRE output signal 320 is asserted by the state machine 321 between the read and write cycles of each operation to cause the data holding register to transition from accumulating data from the ROM 104 to outputting data to the RAM 118.

Completion of ROM shadowing is detected by the address comparator 324. The address comparator 324 is preloaded, by some suitable means such as hardwiring jumpers, with a value equal to the lowest address of ROM data to be transferred minus one. The address comparator 324 monitors the address output by the decrementing address counter 322. When the address output by the decrementing address counter 322 is equal to the address preloaded into the address comparator 324, the address comparator asserts the output signal transmitted to the flip-flop 334 and to the state machine 321 via internal signal line 342. When this signal is asserted by the address comparator 324, the state machine 321 discontinues performing operations, and the flip-flop 334 is reset. When the flip-flop is reset, the flip-flop produces a low signal to the inverting input of NAND gate 332. The other input to NAND gate 332, the $\overline{\text{RESET}}$ input signal 302, has, by this time, transitioned back to inactive high, as a result of which the NAND gate 332 outputs a low signal. Therefore, when the flip-flop is reset, the CPU_RESET output signal 308 is deasserted and the CPU 106 can be initialized and begin executing instructions from RAM 118 in order to complete the bootstrap operation. The RAM_RD_OK output signal 310, essentially the inverted output of the flip-flop 334, is low during the ROM shadowing process, and then transitions to high when the flip-flop 334 is reset by the address comparator 324.

Figure 4:
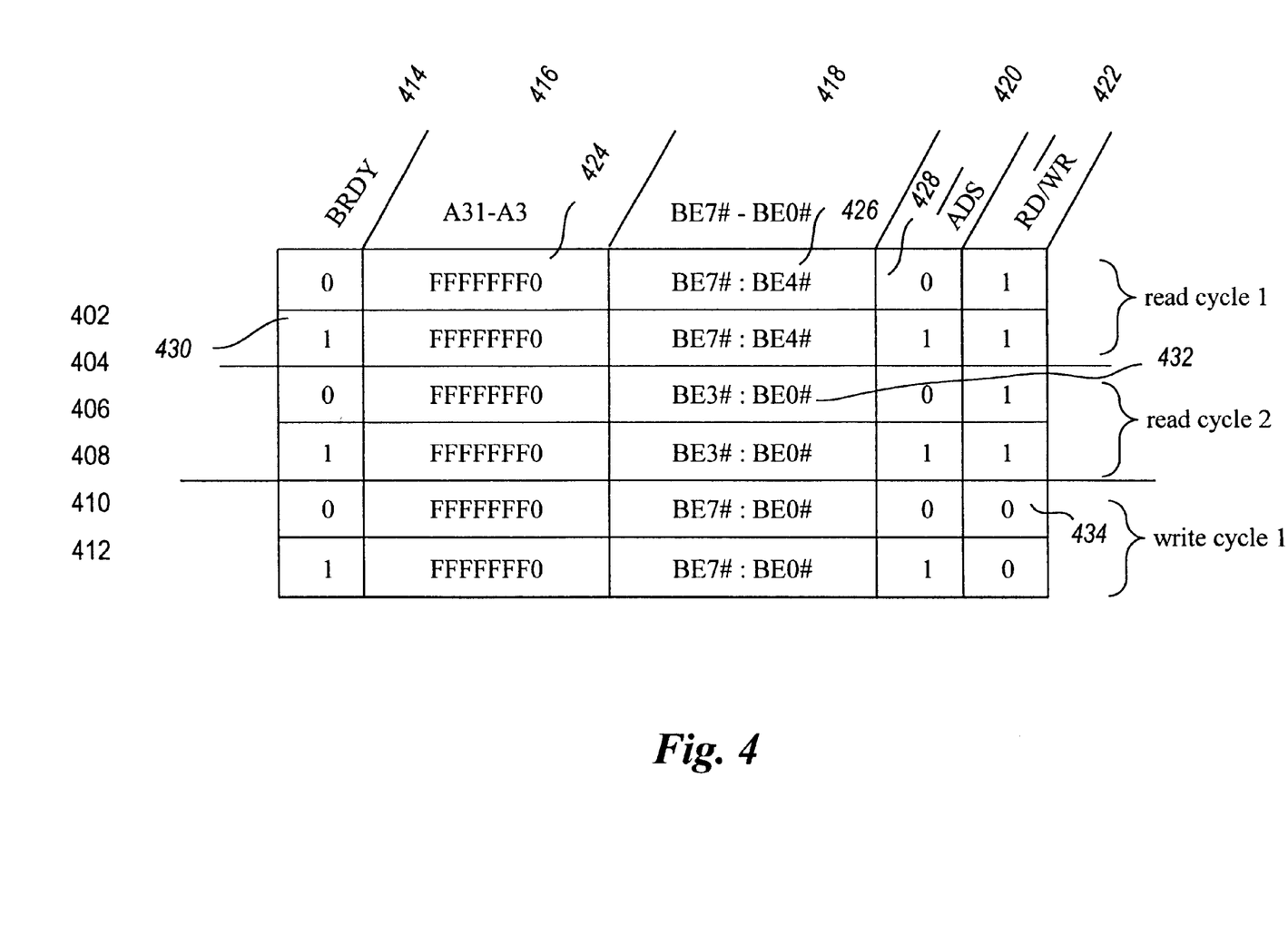
FIG. 4 is a signal chart showing the values of the input and output signals to and from the ROM shadowing circuitry during one ROM shadowing circuit operation.

FIG. 4 is a signal chart showing the values of the BRDY input signal to the RSC and the A31–3, BE7#–BE0#, $\overline{\text{ADS}}$, and RD/$\overline{\text{WR}}$ output signals from the RSC during one operation. In the embodiment discussed above, one RSC operation is composed of 3 bus cycles—two read cycles followed by one write cycle. In the discussed embodiment, each of these bus cycles may be actually composed of multiple bus-level bus cycles. In other words, what is referred to as a bus cycle, from the standpoint of the CPU 106 and the RSC output signals, may actually be translated by the system controller and bus controllers into a number of bus-level bus cycles. The data holding register 336 accumulates one 64-bit quadword via two 32-bit read cycles, and writes the 64-bit quadword in a single write cycle. Each read cycle is, in turn, composed of 4 bus-level bus cycles. The exact sequence and number of bus cycles required during each RSC operation depends on many factors, including bus characteristics, machine architecture, and the characteristics of the data holding register. These factors will vary from one type of PC to another, and may widely vary between different types of computer systems.

In the Intel Pentium CPU-based PC of the described embodiment, each read cycle transfers 4 eight-bit bytes from ROM 104 to the data holding register 336. A 20-bit address is used to access each byte in ROM. In the PC of the embodiment, the 17 highest bits of this address are obtained from address outputs A19–3, and the lowest 3 bits are obtained as a result of address translation by logic within the system controller 114 involving the byte enable output signals. The eight byte enable output signals correspond to the eight 8-bit bytes within a quadword. Each quadword is addressed by address outputs A31–3, with bits 2, 1, and 0 presumed to be 0. Each read cycle in this embodiment requires that four separate read operations from ROM be performed by the hardware to accumulate a 32-bit doubleword within the data holding register 336.

Each pair of rows in FIG. 4 represent one bus cycle. Rows 402 and 404 represent the first read cycle, rows 406 and 408 represent the second read cycle, and rows 410 and 412 represent the write cycle. Column 414 shows the value of the BRDY input signal that indicates that a read or write has completed. Column 416 shows the hexadecimal value corresponding to the address indicated by address outputs A31–A3. The lowest 3 bits of the address are presumed to be 0. Depending on the nature of the memory being addressed, the byte enable outputs are used in address translation to provide values for the lowest 3 bits of an address. In the example shown in FIG. 4, the address FFFFFFF0h is used. As discussed above an initial address is loaded into the decrementing address counter, and successive addresses are generated by decrementing the contents of the decrementing address counter by one. Column 418 shows which of the byte enable output signals, BE0# through BE7#, are asserted during a portion of a bus cycle. The address status output signal, $\overline{ADS}$, shown in column 420, is asserted low during the initial part of a bus cycle to initiate a read or write, and the read/write output signal, RD/$\overline{WR}$, shown in column 422, is asserted high to indicate a read operation and deasserted low to indicate a write operation.

In the first read cycle, rows 402 and 404, 4 eight-bit bytes are read from four consecutive ROM address, starting with ROM address FFFF4. This 20-bit ROM address is composed of 17 bits taken from address outputs A19–A3 424 and 3 bits translated from the byte enable output signals 426. Since the highest 4 bytes of a quadword are indicated by the four byte enable output signals BE7#:BE4# being asserted 424, the address translation hardware adds 4 to FFFF0 to produce the ROM address FFFF4 for the fifth byte of the quadword having address FFFF0. After each of the first three of the four bus-level bus cycles in the first read cycle, one is added to the ROM address by the address translation hardware in order to fetch the next highest byte. Thus, in the 4 bus-level bus cycles that comprise the first read cycle, ROM bytes FFFF4, FFFF5, FFFF6, and FFFF7 are read from ROM 104 and accumulated in the data holding register 336. The $\overline{ADS}$ output signal is asserted low, 428, to initiate the read, and the BRDY input signal 430 is asserted in row 404 to indicate that the read has completed. Similarly, ROM bytes FFFF0 through FFFF3 are read from ROM 104 and placed in the data holding register 336 during the second read cycle, represented as rows 406 and 408 in FIG. 4. In this second read cycle, the lowest 4 bytes are indicated by byte enable output signals BE3#:BE0# 432 being asserted. Finally, during the write cycle represented by rows 410 and 412, all 8 eight-bit bytes read from ROM during the first and second read cycles, and accumulated in the data holding register 336, are written to the RAM 118 quadword address FFFFFFF0 in a single bus-level cycle. The RD/$\overline{WR}$ output signal 434 is deasserted during this final cycle to indicate that a write operation is to be performed by the system controller and bus hardware.

Thus, the RSC 202 iteratively performs successive RSC operations by generating the output signals as shown in FIG. 4 to transfer, during each operation, 8 bytes of ROM data 102 from ROM 104 to RAM 118. The first operation begins with an initial address that is preloaded into the decrementing address counter. The initial address is decremented by one prior to each successive RSC operation. Since the lowest three bits of an address are assumed to be 0, decrementing the address contained in the decrementing address counter 322 by one effectively decrements the byte address by eight.

Figure 5:
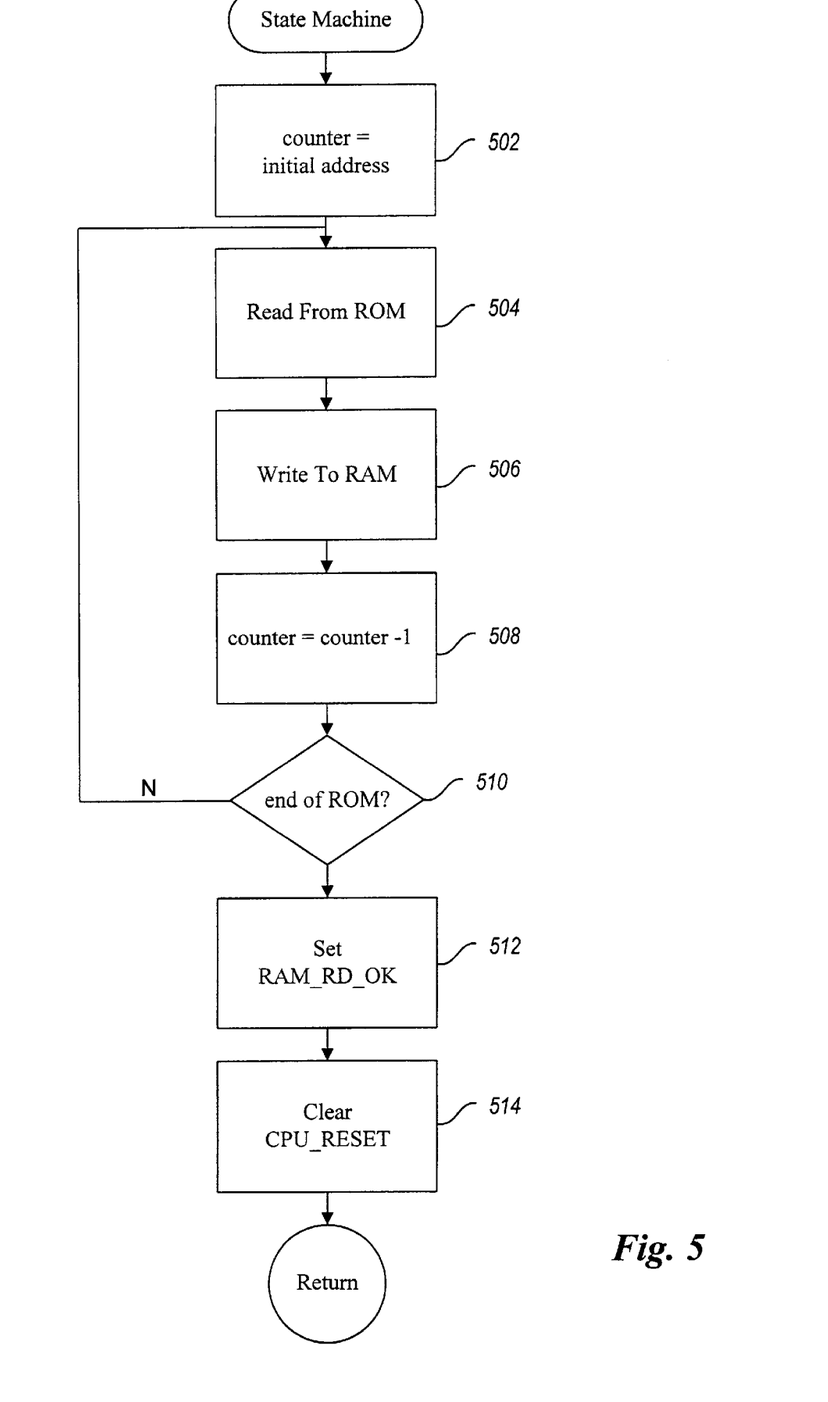
FIG. 5 is a flow control diagram for the state machine component of the ROM shadowing circuit shown FIG. 3.

FIG. 5 is a flow control diagram for the state machine 321 of the embodiment described above. Following assertion low of the $\overline{RESET}$ input by the PC system, the decrementing address counter 322 is loaded in step 502 with the highest address of the RAM 118 to which ROM data 102 will be transferred. In step 504, the state machine generates output signals to cause eight 8-bit bytes to be read from the ROM 104 and transferred into the data holding register 336. In step 506, the state machine 321 causes the contents of the data holding register 336 to be written to the RAM 118 at the address contained in the decrementing counter 322 and indicated by output signals A31–A3 312. In step 508, the state machine 321 causes the decrementing address counter 322 to decrement the address that the decrementing address counter contains by one. In step 510, the address comparator 324 tests the current output from the decrementing address counter 322 to determine whether the current contents of the decrementing address counter are less than the lowest address of data to be read from the ROM 104 and written to the RAM 118. If not, implying that there is more ROM data 102 to be copied from the ROM 104 to the RAM 118, the process repeats starting at step 504. If all the data has been copied, then the address comparator 324 asserts the output through internal signal line 342 that causes the RAM_RD_ OK output signal 310 to transition high, in step 512, and that causes the flip-flop reset that results in the CPU_RESET output signal 308 to transition low in step 514.

Although the present invention has been described in terms of one embodiment, it is not intended that the invention be limited to this embodiment. Modification within the spirit of the invention will be apparent to those skilled in the art. For example, an RSC can be implemented to perform ROM shadowing for any number of different types of computer systems. Depending on the CPU and system controllers with which those computer systems are implemented, different states and operations will be inhabited and performed by the state machine within the RSC, and the RSC may include different inputs and outputs. The RSC, described above, copies one contiguous set of data from ROM to RAM, but other implementations of the RSC are possible, including RSCs that perform BIOS decompression and place ROM data into multiple locations within RAM. The RSC can be implemented as a separate device or can be included within other components of the PC. Also, although the RSC is preferably implemented as an application specific integrated circuit, it will be understood that other implementations, such as hardwired logic circuitry or a programmable logic array, may also be used. The amount of ROM data transferred, the ROM address from which the data is transferred, and the RAM address to which the data is transferred, may vary depending on the respective expected locations for the ROM data and firmware routines in RAM in different computer systems. The scope of the present invention is defined by the claims that follow.

What is claimed is:

1. A method for booting a computer following a power on or a reset of the computer, the computer including a ROM, a RAM, a system controller and a CPU, the ROM storing data, including firmware routines, for initializing the computer, the method comprising:

intercepting a power on or reset signal within the computer and maintaining assertion of the power on or reset signal in order to hold the CPU in a reset state;

while the CPU is held in the reset state, copying the ROM data to the RAM in a plurality of data transfer operations by supplying a current RAM address and a current ROM address to the system controller in order that the system controller causes data to be read from the current ROM address and written to the current RAM address, and, prior to each subsequent data transfer operation, changing the current RAM address and the current ROM address to describe the ROM data that will be copied from the ROM and to describe a RAM location to which the ROM data will be copied during the subsequent data transfer operation;

after the ROM data is copied to RAM, deasserting the CPU reset signal in order to allow the CPU to be initialized; and executing by the CPU the firmware routines copied from ROM to RAM in order to initialize the computer.

2. The method of claim 1 further comprising copying the ROM data from one contiguous ROM block in the ROM to one contiguous RAM block in the RAM.

3. The method of claim 1 further comprising copying the ROM data into multiple RAM blocks within the RAM.

4. The method of claim 1 further comprising using a burst ready input signal to detect completion of each data transfer operation.

5. The method of claim 1 further comprising using a system clock input signal to time each data transfer operation, each data transfer operation composed of a fixed number of bus cycles and each bus cycle composed of a fixed number of clock cycles.

6. The method of claim 1 further comprising using a single current address both for the current ROM address and the current RAM address.

7. The method of claim 1 further comprising retrieving an initial current address from a programmable read only memory upon assertion of the reset input.

8. The method of claim 1 further comprising hardwiring an initial current address into the computer and retrieving the hardwired initial current address upon assertion of the reset input.

9. The method of claim 1 further comprising comparing the current address to a final address in order to detect when the copy of ROM data to the RAM has been completed.

10. The method of claim 9 further comprising retrieving the final address from a programmable read only memory upon assertion of the reset input.

11. The method of claim 9 further comprising hardwiring a final address into the computer and retrieving the hardwired final address upon assertion of the reset input.

12. The method of claim 1 further comprising, after completion of a data transfer operation, decrementing the current address.

13. The method of claim 12 further comprising decrementing the current address by one.

14. The method of claim 1 further comprising, after completion of a data transfer operation, incrementing the current address.

15. The method of claim 14 further comprising incrementing the current address by one.

16. The method of claim 1 further comprising addressing each quadword of the RAM using a 32-bit address, addressing each byte of the ROM using a 20-bit address, and using all 32 bits of the single current address as the current RAM address and using the lowest 20 bits of the single current address as the ROM address.

17. The method of claim 16 further comprising supplying the current address via 29 address signals corresponding to the highest 29 bits of a 32-bit address, wherein the low 3 bits of the 32-bit address are presumed to be 0, and via 8 byte enable signals to indicate which bytes of an 8-byte quadword corresponding to the current address are to be read or written during a data transfer operation.

18. The method of claim 17 further comprising, at the start of both a read from ROM and a write to RAM, asserting an address status signal to indicate that the address output signals reflect the address of the data to be read from ROM and written to RAM, respectively.

19. The method of claim 17 further comprising, at the start of a read from ROM, asserting a read/write signal high to indicate a read, and, at the start of a write to RAM, asserting a read/write signal low to indicate a write.

20. In a computer system including a ROM, a RAM, a system controller and a CPU, a method for copying a quantity of ROM data to the RAM following a power on or reset of the computer system, the ROM data including firmware routines that in itialize the computer system, the method comprising:

intercepting a power on or reset signal within the computer system and asserting a CPU reset signal in order maintain the CPU of the computer system in a reset state while the ROM data is copied;

copying the ROM data to the RAM by employing a state machine that is activated in response to assertion of the reset input signal to carry out the copying of the ROM data to the RAM in a plurality of data transfer operations, a current RAM address and a current ROM address being supplied to the system controller during each data transfer operation in order that the system controller causes data to be read from the current ROM address and written to the current RAM address and, prior to each subsequent data transfer operation, changing the current RAM address and the current ROM address to describe the ROM data that will be copied from the ROM and to describe a RAM location to which the ROM data will be copied during the subsequent data transfer operation performed by the state machine; and deasserting the CPU reset signal in order to allow the CPU to be initialized and to execute the firmware routines.

21. The method of claim 20 further comprising employing a logic circuit to intercept the power on or reset signal, to assert the CPU reset signal, and to deassert the CPU reset signal.

22. The method of claim 20 wherein the firmware routines include initialization routines, input/output routines, and interrupt service routine, and a power-on self test routine.

23. The method of claim 20 further comprising copying the ROM data from one contiguous ROM block in the ROM to one contiguous RAM block in the RAM.

24. The method of claim 20 further comprising copying the ROM data into multiple RAM blocks within the RAM.

25. The method of claim 20 conducted in a personal computer to copy a quantity of ROM data to the RAM during the boot process in which the personal computer is initialized following power on or reset.

26. The method of claim 20 further comprising using a system clock signal to time each data transfer operation, each data transfer operation composed of a fixed number of bus cycles and each bus cycle composed of a fixed number of clock cycles.

27. The method of claim 20 further comprising using a burst ready signal to detect completion of each data transfer operation.

28. The method of claim 20 further comprising employing a state machine that is activated in response to assertion of the reset signal to carry out the copying of the ROM data to the RAM in a plurality of data transfer operations.

29. The method of claim 20 further comprising copying data from ROM to RAM via an ISA bus, a ISA-PCI bus bridge, a PCI bus, a system controller, and a memory bus.

30. The method of claim 20 further comprising employing an address counter to supply the current RAM address and the current ROM address to the system controller.

31. The method of claim 30 further comprising retrieving by the address counter an initial current address from a programmable read only memory upon assertion of the reset input.

32. The method of claim 31 further comprising hardwiring an initial current address into the address counter using a hardwiring jumper.

33. The method of claim 30 further comprising, after completion of a data transfer operation, decrementing the address output by the address counter.

34. The method of claim 33 further comprising decrementing the address output by the address counter by one.

35. The method of claim 30 further comprising, after completion of a data transfer operation, incrementing the address output.

36. The method of claim 35 further comprising incrementing the address output by the address counter by one.

37. The method of claim 20 further comprising comparing the current address to a final address in order to detect when the copy of ROM data to the RAM has been completed.

38. The method of claim 37 further comprising employing an address comparator to compare the current address to the final address.

39. The method of claim 38 further comprising hardwiring the final address into the address comparator using a hardwiring jumper.

40. The method of claim 38 further comprising retrieving the final address by the address comparator from a programmable read only memory upon assertion of the reset input.

41. The method of claim 20 further comprising using a single current address both for the current ROM address and the current RAM address.

42. The method of claim 20 further comprising addressing each quadword of the RAM using a 32-bit address, addressing each byte of the ROM using a 20-bit address, and using all 32 bits of the single current address as the current RAM address and using the lowest 20 bits of the single current address as the ROM address.

43. The method of claim 42 further comprising supplying the current address via 29 address output signals corresponding to the highest 29 bits of a 32-bit address, wherein the low 3 bits of the 32-bit address are presumed to be 0, and via 8 byte enable signals that indicate which bytes of an 8-byte quadword corresponding to the current address are to be read or written during an operation.

44. The method of claim 43 further comprising, at the start of both a read from ROM and a write to RAM, asserting an address status output signal to indicate that the address output signals reflect the address of the data to be read from ROM and written to RAM, respectively.

45. The method of claim 43 further comprising, at the start of a read from ROM, asserting a read/write output high to indicate a read, and, at the start of a write to RAM, asserting a read/write output signal low to indicate a write.

* * * * *

UNITED STATES PATENT AND TRADEMARK OFFICE
CERTIFICATE OF CORRECTION

PATENT NO.   : 6,216,224 B1
DATED         : April 10, 2001
INVENTOR(S) : Dean A. Klein It is certified that error appears in the above-identified patent and that said Letters Patent is hereby corrected as shown below:

<u>Title page,</u>
References Cited, U.S. PATENT DOCUMENTS, please add the following reference:

-- 4,528,634   07/1985   Nakahata et al.   364/491 --

Signed and Sealed this

Fourteenth Day of May, 2002

Attest:

Attesting Officer

JAMES E. ROGAN
Director of the United States Patent and Trademark Office